CARRIER RESPONSIVE SYNCHRONIZING SYSTEM

Filed March 8, 1954 2 Sheets-Sheet 1

INVENTOR.
EDGAR W. VAN WINKLE
BY
[signature]
[signature]
ATTORNEYS

April 5, 1960 E. W. VAN WINKLE 2,931,859

CARRIER RESPONSIVE SYNCHRONIZING SYSTEM

Filed March 8, 1954 2 Sheets-Sheet 2

INVENTOR.
EDGAR W. VAN WINKLE
BY F. A. Miller
Max D. Farmer
ATTORNEYS

United States Patent Office

2,931,859

Patented Apr. 5, 1960

2,931,859

CARRIER RESPONSIVE SYNCHRONIZING SYSTEM

Edgar W. Van Winkle, Rutherford, N.J., assignor to the United States of America as represented by the Secretary of the Navy Application March 8, 1954, Serial No. 414,919

3 Claims. (Cl. 178—69.5)

This invention relates to a synchronizer for a facsimile recording system.

This invention is adapted for use in a facsimile recording system and more particularly for a type of facsimile recording system disclosed herein, which latter comprises the subject matter of copending patent application Serial No. 414,917, filed March 8, 1954, for Facsimile Recording System, by Edgar W. Van Winkle.

In U.S. Patent No. 2,540,922 there are shown some conventional portions of a facsimile sytem which showing is used to explain the problem that was encountered before this invention was made. A transmitter drum is rotatably supported on a fixed traverse screw and has a linear phasing mark parallel to its axis. A synchronous motor is coupled to the transmitter drum to rotate the latter at a constant rate and to move the latter longitudinally along the traverse screw at a constant rate. A sheet of paper bearing the information to be transmitted is wrapped around and secured to the transmitter drum with one edge of the paper aligned with the phasing mark. The carrier is generated by means driven by the synchronous motor so that the frequency of the carrier is a multiple of the rate of rotation of the transmitter drum. A lamp is focused by a lens means to a fixed point in the path of the transmitter drum surface and a phototube is sighted at the same fixed point. When the transmitter drum is driven, the focussed light spot describes a tight spiral path on the transmitter drum and the phototube generates a signal which is proportional to that part of the energy from lamp 5 that is reflected from the transmitter drum. The reflected energy varies with the tone or shade at the focal point. The signal generated by the phototube is amplitude-modulated on the carrier. The modulation information contains periodic pulses corresponding to the movement of phasing mark past the focal point of the lens.

Generally the carrier frequency of a facsimile signal is 1800 cycles per second; this frequency has been widely adopted because it is suitable for transmission over telephone audio circuits and because it is a convenient multiple of 60 cycle power supply frequency. However, insofar as the facsimile system operation is concerned, the carrier frequency need not be 1800 cycles per second. The carrier frequency can be greater or smaller than 1800 cycles; however, the ratio of carrier frequency to drum speed at any one particular transmitter is constant. Also, the amplitude modulation of the carrier may be as high as 100 percent. Also, under some circumstances there is no phasing mark on the transmitter drum. Consequently, a need has arisen for a versatile synchronizer that can synchronize a facsimile recorder with substantially any facsimile transmitter whose carrier frequency output is not known beforehand, and which does not generate periodic phasing information and whose carrier is interrupted repeatedly several cycles at a time due to 100 percent modulation of the carrier.

An object of this invention is to provide a synchronizer for a facsimile recorder wherein the synchronizer is responsive to the carrier of a facsimile signal to synchronize the recorder with the transmitter of the facsimile signal.

A further object is to provide a synchronizer in accordance with the preceding object which can synchronize a recorder with any transmitter regardless of carrier frequency and regardless of the absence of periodic phasing information and regardless of the interruptions in the carrier as a consequence of 100 percent modulation and regardless of the ratio of line scanning rate to carrier frequency.

A further object is to provide a synchronizer in accordance with either of the preceding objects such that there is substantially no line-by-line jitter on the facsimile recording.

A further object is to provide a synchronizer for facsimile recording systems adapted to provide for the same frequency standard to be used at the facsimile recording system as is used at a facsimile transmitter whose signal is being processed by the facsimile recording system.

A further object is to provide a synchronizer for facsimile recording systems which acts to process facsimile signal carrier frequency voltage into synchronizing trigger pulses.

Other objects and many of the attendant advantages of this invention will be readily appreciated as the same becomes better understood by reference to the following detailed description when considered in connection with the accompanying drawings wherein.

Figure 1:
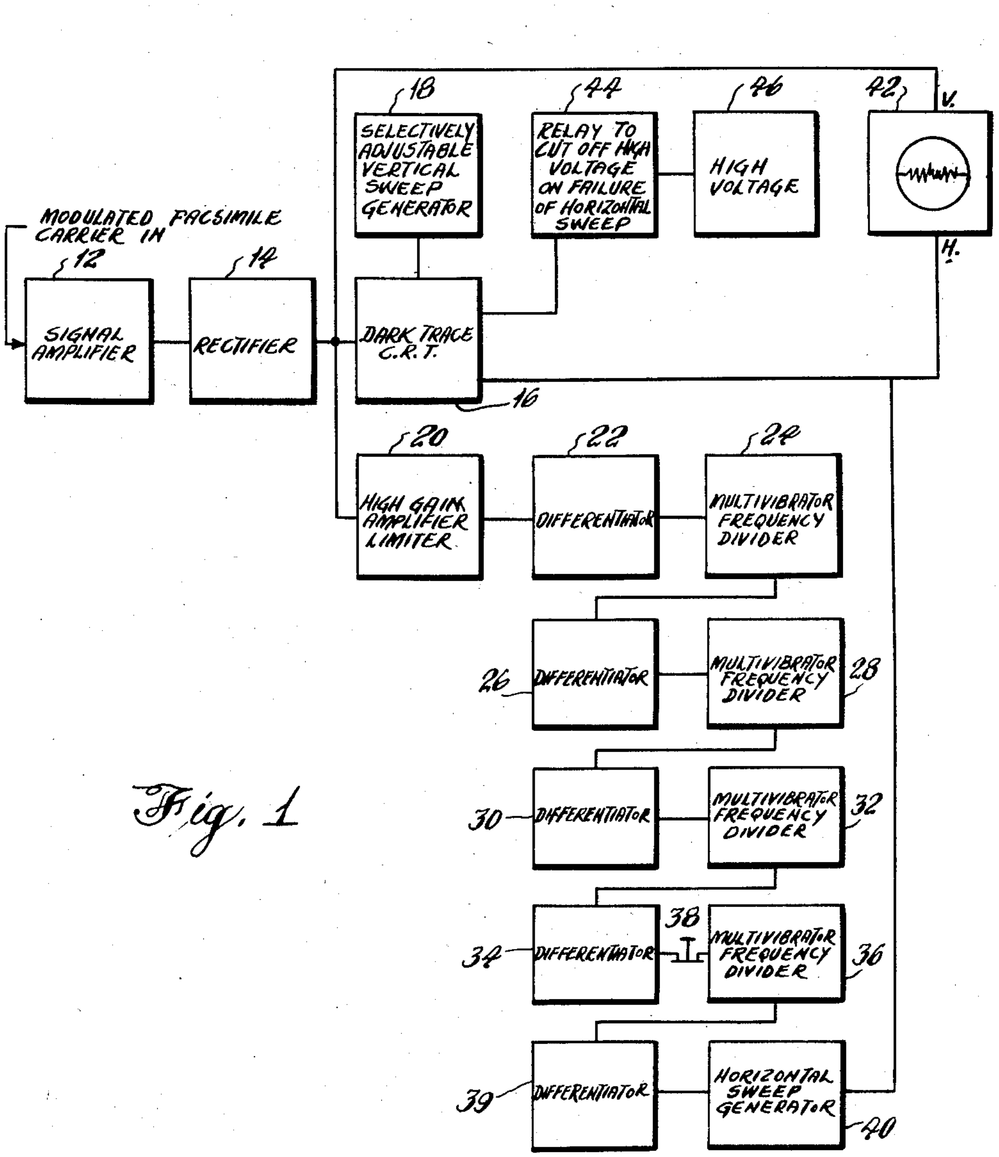
Fig. 1 is a block diagram of an embodiment of this invention.
Figure 2:
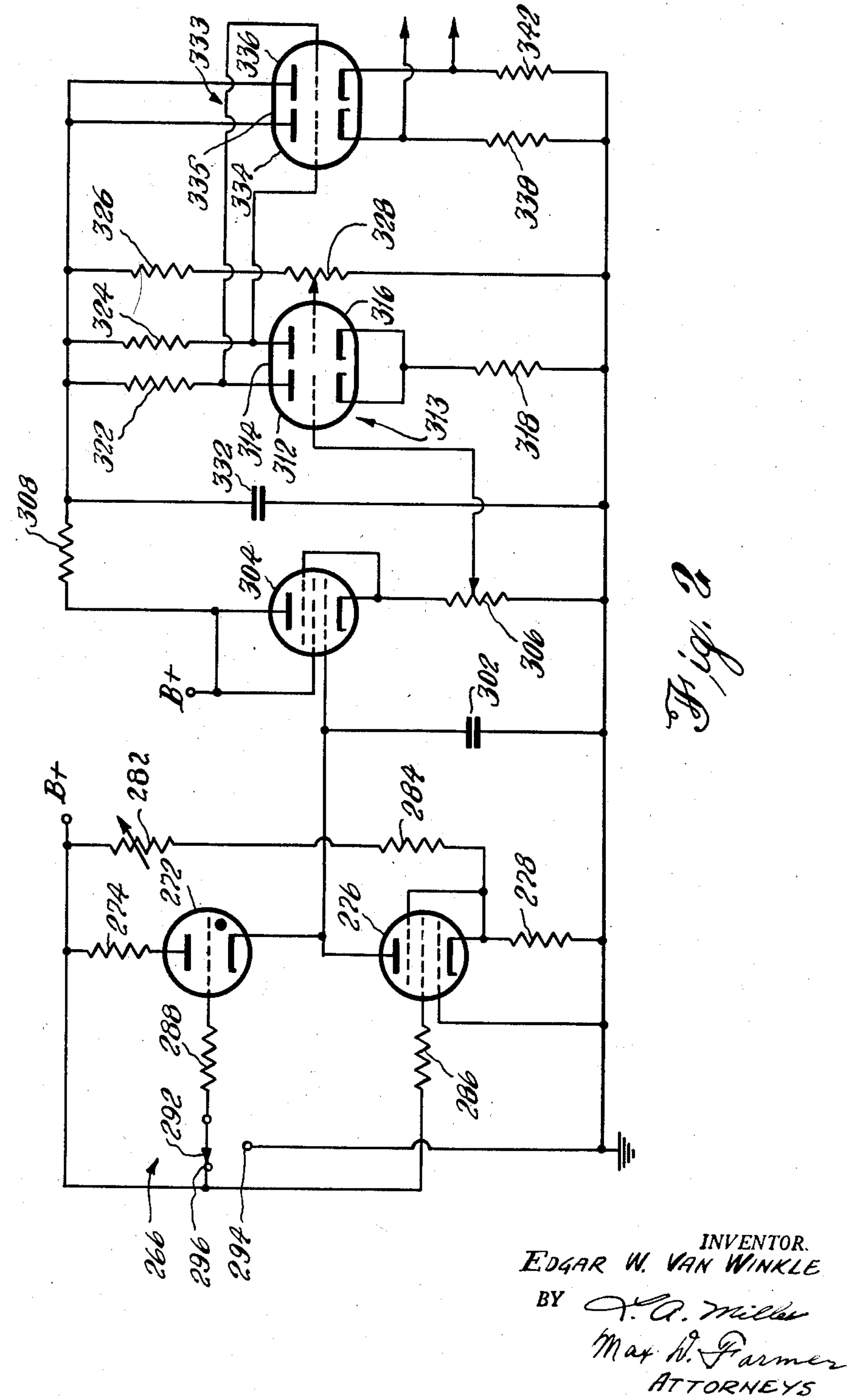
Fig. 2 illustrates a vertical sweep generator circuit for use in the embodiment shown in Fig. 1.

The incoming facsimile signal, an amplitude modulated carrier whose frequency generally is on the order of 1800 cycles per second is amplified by means of the wide band or video amplifier 12.

Part of the output energy from the amplifier 12 is rectified by detector 14 and the positive voltage portion of the rectifier energy is coupled into the intensity modulation input of a dark-trace cathode ray tube 16.

A selectively adjustable vertical sweep circuit 18 is provided for controlling the vertical deflection of the beam of the cathode ray tube 16 in accordance with page scanning rate at the facsimile transmitter whose message is received. It includes a thyratron 272 (e.g. type 884). A load resistor 274 is connected in series with the plate of the thyratron 272 and B+. Connected in series between the cathode of the thyratron 272 and ground 50 is a sharp cut-off pentode 276 (e.g. 6AU6), and a cathode bias resistor 278 for the pentode. The cathode bias resistor 278 is part of a series resistance voltage-divider circuit connected between B+ and ground 50. The voltage-divider circuit includes the rheostat 282 and fixed resistor 284. The bias on the cathode of the pentode 276 and therefore the period of output waveform is controlled by means of the rheostat 282, the latter having a maximum value which is more than 10 times the combined resistance of the cathode resistor 278 and the fixed resistor 284. The plate current of the pentode 276, when the latter is conducting, is substantially constant. The control grid of the pentode 276 is connected directly to ground 50. The screen grid of the pentode 276 is connected to B+ through a screen dropping resistor 286. The suppressor grid of the pentode 276 is connected to the cathode. In series with the grid of the thyratron 272 is a current limiting resistor 288. The end of the resistor 288 opposite that connected to the grid of the thyratron 272 is connected to the movable contact of a push-button switch 292. The switch 292 as shown on the drawing is in activated position. One terminal 294 of the switch 292 is connected directly to ground 50. The other terminal 296 of the push-button switch 292 is connected directly to the source of plate supply voltage for the thryratron 272. When the switch 292 is pushed so that contact 292 engages terminal 296, as shown on the drawing the thyratron conducts immediately. The purpose of the push-button switch 292 is for positioning the spot at the top of the dark-trace tube 16, the beginning of a vertical sweep. The vertical sweep voltage is developed across the condenser 302. When the thyratron 272 fires the condenser 302 charges up in negligible time to that voltage which is so related to the voltage at the plate of the thyratron 272 that the difference between them equals the extinguishing potential of the thyratron. The condenser 302 then discharges at a uniform rate through the constant current pentode 276, until the potential at the cathode of the thyratron 272 is such that the firing potential is again developed across the thyratron 272 and the latter fires again to recharge the condenser 302. The sawtooth voltage waveform thus generated is raised to a higher energy level by a cathode follower 304. The cathode follower 304 is a sharp cut-off pentode (e.g. 6AG5). The suppressor grid and cathode of the pentode 304 are directly connected to one another and the screen grid and plate are directly connected to one another. In series between cathode and ground is the resistance coil of a potentiometer 306. The output of the cathode follower 304 taken from potentiometer 306 is fed into the triode section 312 of a balanced differential amplifier 313, arranged with one moving grid and one fixed grid. The balanced differential amplifier comprises a double triode (e.g. 12AU7) one-half of which is the triode section 312 and the other half is a triode section 316. The cathodes of both triode sections 312 and 316 are mutually joined and connected to ground through a cathode resistor 318. The plates of the triode sections 312 and 316 are connected in circuit with identical plate-load resistors 322 and 324. The bias on the grid of the triode section 316 is held at a substantially fixed potential by being connected to a voltage divider including a fixed resistor 326 and a potentiometer 328. Resistor 326 and the resistance coil of a potentiometer 328 are connected in series between the source of plate supply voltage for the differential amplifier 313 and ground 50. An RC circuit is connected across the source of the plate voltage just beyond cathode follower 304 and includes the resistor 308 and the condenser 332. The RC circuit including the resistor 308 and the condenser 332 acts to hold the plate voltage supply for the differential amplifier 313 constant. The output of the differential amplifier is very nearly push-pull. When the input signal to the grid of the triode section 312 is at its lowest value the current flow through the triode section 312 is at a minimum, the current flow through the triode section 316 is at a maximum. With increased current flow through the triode section 312 the bias on the triode section 316 increases, thereby decreasing the current flow through the latter. This is due to the fact that the change in the amount of current flow through the triode section 312 acts to vary the bias on the triode section 316. Conversely with decreased current flow through the triode section 312 the bias on the triode section 316 is reduced, permitting increased current flow through the triode section 316. The voltage at the plates of the triode sections 312 and 316 change in opposite directions in accordance with the changed current flow through each of the respective sections.

The power needed for the vertical deflection coil, not shown, of the dark trace cathode ray tube is taken from the double cathode follower arrangement 333. It includes two triode sections 334 and 336 of a double triode 337 (e.g. 6AS7). The triode section 334 is connected in series with a cathode resistor 338 and the triode section 336 is connected in series with a cathode resistor 342. The grids of the sections 334 and 336, respectively, are connected directly to the plates of the respective triode sections 316 and 312 of the differential amplifier 313. No coupling condensers are needed; through proper design the bias on the cathode follower is correct for direct coupling. The vertical deflection coil, not shown, is connected to the output terminals of the cathode follower. Through this arrangement the current flow in the vertical deflection coil changes lineally flowing first as a maximum in one direction, changing lineally until it is a maximum in the other direction. The period of the vertical oscillator is very long in accordance with facsimile practice. The period of the vertical oscillator is adapted to be adjusted by means of the rheostat 282 which varies the bias on the pentode 276 and thereby the discharge rate of condenser 302.

The frequency of the sweep voltage for the horizontal deflection coil, not shown, of the dark-trace tube 16 is synchronized at an exact sub-multiple of the carrier frequency of the input facsimile signal. From the output of the video amplifier 12, a portion of the amplified signal energy is fed into a high gain amplifier limiter circuit 20. A suitable circuit for the high gain amplifier limiter of this invention is disclosed in U.S. Patent 2,791,741; this circuit produces a series of substantially rectangular pulses of constant amplitude repeating at the same frequency as the facsimile signal carrier frequency, there being a rectangular pulse for each carrier cycle. The portion of the amplified facsimile signal energy which is taken from the output of the video amplifier 12 consists of the carrier frequency voltage modulated with the facsimile information. The carrier is present regardless of what is being scanned at the transmitter end of the system. When the carrier is modulated 100 percent, groups of cycles of the carrier are eliminated at repeated intervals.

The rectangular pulse train output of the high gain amplifier limiter 20 is passed through a differentiator for triggering a locked multivibrator frequency divider 24. Thence the signal passes in succession through differentiator and multivibrator frequency divider stages 26, 28, 30, 32, 34 and 36. A normally closed manual switch 38 is connected between stages 34 and 36. The multivibrators maintain their output when the driving pulses are interrupted transitorily. In this invention, if the carrier modulation is 100 percent or close to 100 percent, the series of substantially rectangular pulses from the high gain amplifier limiter 20 are interrupted repeatedly for a number of pulses at a time. However, the multivibrator frequency divider stages maintain their output at the same repetition rate when the carrier is interrupted as when carrier is present. If an interruption is comparatively brief there is no frequency drift. A horizontal sweep generator 40 is connected to the output of differentiator 39. Since the repetition rate of the output voltage pulses of the multivibrator stage 36 is a fraction of the carrier frequency, phasing means are needed. Phasing is accomplished by means of the switch 38 between the multivibrator stage 32 and the multivibrator stage 36. The output end of the horizontal sweep generator 40 provides the vertical deflection energy for dark trace cathode ray tube 16. The horizontal deflection means of an oscilloscope 42 is connected to the output of horizontal sweep generator 40 and its vertical deflection means is connected to the output of rectifier 14 for displaying the facsimile signal line-by-line.

Since the vertical sweep frequency is extremely slow, if the horizontal sweep generator 40 were to fail, the face of the cathode ray tube 16 would be burned. To provide a safety measure, a relay circuit 44 is provided for cutting off high voltage supply 46 for the dark trace cathode ray tube 16 in the event of failing of the horizontal sweep.

Synchronizing involves getting the beginning of each line on the recorder to correspond with the beginning of each transmitted line. If the recorded information were not properly synchronized, even though at the same horizontal sweep frequency, the recorded information would appear the same as would be achieved by longitudinally dividing the transmitted sheet in two and securing them in reverse relationship, i.e. if the transmitted sheet read ABCD, the recorded information would read CDAB, or the like. The oscilloscope 42 helps to expedite the synchronizing process. The horizontal deflection frequency is identical with the horizontal deflection frequency of the dark trace tube 16 and the transmitted line rate, where known, and the vertical deflection is proportional to the instantaneous voltage of the facsimile signal. Since each line of the facsimile signal has a repeating characteristic viewing this repeating characteristic serves to guide in synchronizing. Where the transmitted line rate is not known, the oscilloscope 42 permits observation of the voltage waveform. In connection with the latter the synchronizing system for the horizontal sweep voltage would be eliminated and replaced by a free-running oscillator. By adjusting a free-running oscillator in the horizontal sweep circuit while observing the waveform pattern, it is possible to effect synchronization even where the line rate at the transmitter is unknown. Though the circuit as described does not include a free-running oscillator, it is a simple matter to generate the sweep voltage under the control of an adjustable free-running oscillator.

In operation the amplitude modulated carrier facsimile signal energy from video amplifier 12 is rectified by rectifier 14 eliminating the negative half cycles of the signal. The positive half cycles of the signal are fed, in part, into dark trace cathode ray tube 16 as an intensity modulation input and in part to high gain amplifier-limiter 20. The high gain amplifier limiter 20 is operable in response to the positive half cycles of the facsimile signal to generate substantially identical rectangular pulses, one pulse for each positive half cycle of the facsimile signal whose amplitude exceeds the minimum level for activating the high gain amplifier-limiter 20. The rectangular pulses from the high gain amplifier-limiter 20, whose frequency is the same as the facsimile signal carrier frequency are passed through frequency dividing stages 22, 24, 26, 28, 30, 32, 34, 36 and 38, to the horizontal sweep generator 40, the latter providing an output having a repetition frequency which corresponds to the line-scanning rate of the facsimile transmitter whose signal output is processed by the facsimile recording system. Proper phasing of the trigger pulses for horizontal sweep generator 40 is accomplished by actuating the switch 38 in circuit between the multivibrator stages 28 and 32. Actuation of the switch 38 temporarily interrupts the triggering of the last multivibrator stage 36 and when triggering is resumed the output trigger pulses of the synchronizer are at a random phase relationship with respect to the output trigger pulses preceding actuation of the switch 38. By successive actuation of the switch 38 the phase of the output trigger pulses of the synchronizer is caused to change each time until there is derived the desired phase relationship. At that time the facsimile recording system under the control of the synchronizer is ready for operation.

Obviously many modifications and variations of the present invention are possible in the light of the above teachings. It is therefore to be understood that within the scope of the appended claims the invention may be practiced otherwise than as specifically described.

I claim:

1. A synchronizing circuit for synchronizing a facsimile recorder that has no local frequency standard with a facsimile transmitter that is transmitting an amplitude-modulated carrier signal that does not include synchronizing pulses and wherein the modulation is substantially less than 100 percent so that the carrier is always present and the carrier frequency is known and bears a constant relationship to the line scanning rate at the transmitter, which relationship is known, said synchronizing circuit comprising means for receiving some of the signal energy for generating a trigger pulse for every cycle of the carrier, a plurality of cascaded frequency dividers coupled to the output end of said means and operable during transistory interruption in the carrier to provide an output substantially identical to the output therefrom when the carrier is present, for producing a series of synchronizing pulses whose repetition rate is the same as the line scanning rate at the transmitter for use in synchronizing the recorder, a normally-closed manually-operable switch connected in series between the output of one of said frequency dividers and the input of the succeeding frequency divider for use in selectively rapidly shifting the phase of the synchroniznig pulses for synchronizing the recorder so that the arrangement of the material on the facsimile recording corresponds to the arrangement of the transmitted material.

2. A synchronizing circuit for synchronizing a facsimile recorder that has no local frequency standard with a facsimile transmitter that is transmitting an amplitude-modulated carrier signal that includes synchronizing pulses and wherein the modulation is substantially 100 percent so that the carrier is not always present and the carrier frequency is known and bears a constant relationship to the line scanning rate at the transmitter, which relationship is known, said synchronizing circuit comprising means including a high gain amplifier limiter for receiving some of the signal energy for generating a trigger pulse for substantially every carrier cycle in the signal input thereto, the pulses being of substantially the same amplitude, multivibrator frequency divider means coupled to the output of the aforementioned means and operable during transistory interruption in the carrier to provide an output substantially identical to the output therefrom when the carrier is present, for producing a series of synchronizing pulses whose repetiton rate is the same as the line scanning rate at the transmitter for use in synchronizing the recorder.

3. A variable synchronizing circuit for a facsimile recorder that has no local frequency standard, for synchronizing the recorder with substantially any facsimile transmitter that is transmitting information in the form of an amplitude-modulated carrier where the frequency of the carrier bears a constant relationship to line scanning rate at the transmitter, and where the modulation of carrier is anywhere up to 100 percent and does not include phasing pulses and its frequency is not known beforehand at the recorder, said synchronizing circuit comprising means including a high gain amplifier limiter for receiving some of the signal energy as an input thereto for generating a trigger pulse for substantially every carrier cycle in the signal input thereto, the pulses being of substantially the same amplitude, a plurality of cascaded frequency dividers coupled to the output of said means, each of said frequency divider means being adjustable in repetition rate of its output, said adjustable cascaded frequency dividers being operable during transistory interruption in the carrier to provide an output substantially identical to the output therefrom when the carrier is present, a normally closed manually-operable phasing switch connected in series between the output of one of said frequency dividers and the input of the succeeding frequency dividers, and a cathode ray tube display device having vertical and horizontal deflection circuits one of which is coupled to the output end of said cascaded frequency dividers to be synchronized thereby and means for coupling the carrier modulation into the other deflection means whereby the frequency divider means may be adjusted to stop the movement of a continuously repeating waveform portion of the display on the face of the cathode ray tube whereby the repetition rate of the output of the cascaded frequency dividers is rendered the same as the line scanning rate of the transmitter, for causing the recorder to operate in step with the transmitter and whereby said phasing switch is operable to correctly phase the recorder so that the arrangement of the recorded material corresponds to the arrangement of the transmitted material.

References Cited in the file of this patent

UNITED STATES PATENTS

| | | |
|---|---|---|
| 2,284,417 | Gray | May 26, 1942 |
| 2,540,922 | Wickham | Feb. 6, 1951 |
| 2,565,504 | Labin et al. | Aug. 28, 1951 |
| 2,572,698 | Canfora | Oct. 23, 1951 |
| 2,576,676 | Elbourn et al. | Nov. 27, 1951 |